H. J. BIGELOW.
FORK.
APPLICATION FILED AUG. 17, 1914.
1,294,031.
Patented Feb. 11, 1919.
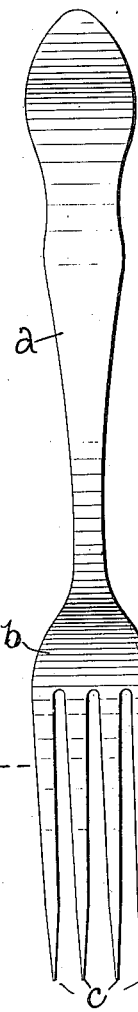
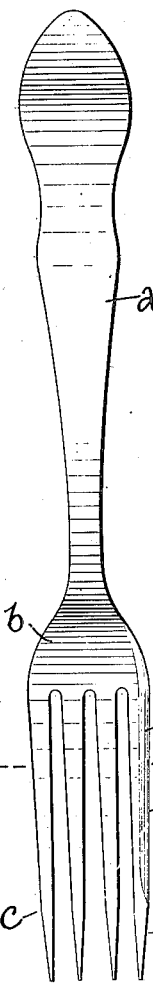
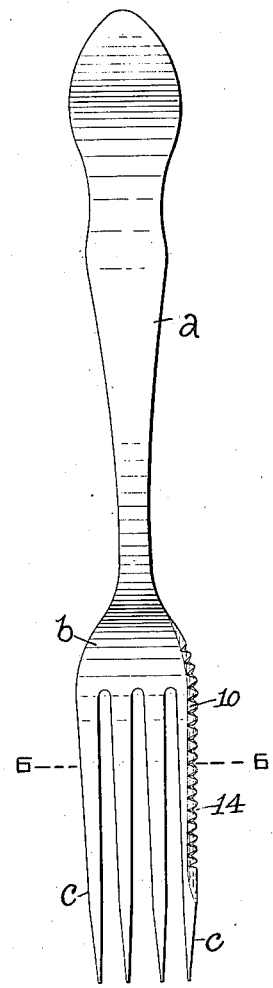
WITNESSES:
John Buckler,
J. Murphy
INVENTOR:
Henry J. Bigelow
by Jas. H. Churchill
atty.

UNITED STATES PATENT OFFICE.

HENRY J. BIGELOW, OF BROOKLINE, MASSACHUSETTS.

FORK.

1,294,031.                    Specification of Letters Patent.        Patented Feb. 11, 1919.

Application filed August 17, 1914.   Serial No. 857,084.

*To all whom it may concern:*

Be it known that I, HENRY J. BIGELOW, a citizen of the United States, residing in Brookline, in the county of Norfolk and State of Massachusetts, have invented an Improvement in Forks, of which the following description, in connection with the accompanying drawings, is a specification, like characters on the drawings representing like parts.

This invention relates to a table fork, such as now commonly in use, and has for its object to impart to the same the functions of a knife without interfering with its functions as a fork, and to accomplish the same without changing the general design and construction of the fork.

To this end the table fork is made the same as now commonly made, with a plurality of tines equal or substantially equal in length, and an outside tine is provided with a beveled portion on its lower or upper surface or on both surfaces, and within the normal contour of the tine and gradually merging into the normal rounded or oval cross-section at or near the point of the tine and into the shank at or near the handle respectively. The beveled portion is sharpened to a cutting edge extending longitudinally of the tine from a material distance at the rear of the front end or point of the tine, and extends rearwardly into the shank or body portion of the fork and preferably to near the handle thereof. The beveled and sharpened portion may be made on the upper or lower surface of the outside tine or upon both surfaces and forms a cutting edge, which is preferably located substantially in the longitudinal center of the tine all within the normal cross-section of the tine of a common table fork.

The beveled surface may be left smooth to form a continuous cutting edge or it may be provided with cross cuts to form teeth, as will be described.

The particular features of this invention will be pointed out in the claims at the end of this specification.

Figure 1 is an elevation of a table fork embodying this invention.

Figs. 2 and 3, like views of modified forms of forks.

Fig. 4, a cross section on the line 4—4, Fig. 2.

Fig. 5, a cross section on the line 5—5, Fig. 1, and

Fig. 6, a cross-section on the line 6—6, Fig. 3.

Referring to Figs. 1 and 5, *a* represents the handle, *b* the shank or body portion, and *c* the prongs or tines of a table fork, which may be of any suitable metal and construction, such as now commonly used. The fork herein shown is provided with four prongs or tines *c*, which are of the same length or substantially so, and one of the outside tines *c* of the fork shown in Fig. 1 is provided on its upper and lower surfaces with beveled portions 10, which converge and form a sharp cutting edge 12 substantially at the transverse center of the tine, which sharp cutting edge extends rearwardly toward and preferably into the shank or body portion *b* of the fork, and also preferably to near the junction of the handle with said shank.

It may be preferred in some cases to form the sharp cutting edge 12 by making the beveled portions 10 in the upper and lower surfaces of the outside tine, but a single beveled portion 10 either on the upper or lower surface may be used, which forms with the other surface of the tine a more or less sharp cutting edge 12 extended longitudinally of the tine and within the normal contour thereof as represented in Figs. 2 and 4, wherein the outside tine is provided with a beveled portion 10 on its under surface.

The sharp cutting edge 12 may be made continuous or unbroken as represented in Figs. 1 and 2, or it may be broken and provided with cross cuts or spaces 14, as represented in Figs. 3 and 6 to form a toothed cutting edge.

I have herein shown the sharp cutting edge on only one outside tine, but it may be formed on either or both.

The improved fork is useful for cutting articles of food, which are not readily severed by the ordinary table fork, such, for instance, as salads, pies, bacon, etc., and at the same time this cutting function is imparted to the fork without interfering with its ordinary functions as a fork, and without necessitating change in the general construction and design of the ordinary fork.

It will be observed that the front end or portion of the outside tine between the front extremity of the sharp cutting edge 12 and the point of the tine is left in its rounded or oval shape in cross-section, merging into the normal triangular cutting portion hereinbefore described, consequently the fork may be partially inserted into the mouth without danger of cutting the corners of the mouth of the user.

By providing the sharp cutting edge 12 on both outside tines, the fork can be used as a knife by either a right or left handed person, but it is preferred to provide the sharp cutting edge on only one outside tine, when the fork is to be used by a right-handed person, and on the other outside tine when the fork is to be used by a left-handed person.

In other words, the cutting edge on one of the outside tines converts the fork into a right or left handed fork, according to which outside tine is provided with the sharp cutting edge.

Claims:

1. A table fork comprising a plurality of substantially uniform straight sided tines projecting from a shank or body portion and having a knife edge extending along the outer side of one of the marginal tines to a point of termination that is at the rear of the mouth engaging end portion of the tine, said unsharpened mouth engaging portion including substantially one third of the length of the tine so that said cutting edge is out of range of the mouth when inserted therein and whereby the strain of cutting is borne by the base portion of the marginal tine and said body.

2. A table fork such as is in general use provided with a row of tines which are substantially of uniform tapering straight sided shape, one of the outer or marginal tines of said row being provided with a knife edge substantially two-thirds of the length of the tine so as to leave a short fork tine on the outer end thereof to shield the mouth from said knife edge and the latter localizing the cutting operations and the strains thereof upon the base of the tine.

In testimony whereof, I have signed my name to this specification in the presence of two subscribing witnesses.

HENRY J. BIGELOW.

Witnesses:
JAS. H. CHURCHILL,
J. MURPHY.